United States Patent Office 3,235,592
Patented Feb. 15, 1966

3,235,592
(N)-QUASI PHOSPHONIUM SALTS
Harold F. Wilson, Moorestown, N.J., and Charles E. Glassick, Levittown, Pa., assignors to Rohm & Haas Company, Philadelphia, Pa., a corporation of Delaware
No Drawing. Filed June 20, 1962, Ser. No. 203,739
6 Claims. (Cl. 260—551)

This invention is concerned with bis(tert-alkylamino)phenylalkylphosphonium, bis(tert-alkylamino)phenylalkenylphosphonium, and bis(tert-alkylamino)phenylaralkylphosphonium salts as new compounds and a process for preparing them. These phosphonium salts may be represented by the general formula

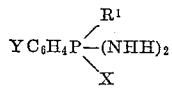

wherein R is a tertiary alkyl group containing up to about 18 carbon atoms;

$R^1$ is an alkyl group containing from 1 to 20 carbon atoms, an alkenyl group containing from 3 to 16 carbon atoms, or a benzyl group which may be unsubstituted or substituted with 1 to 2 alkyl groups containing a total of 1 to 13 carbon atoms or with 1 to 2 chlorine atoms;

Y is hydrogen, halogen or alkyl of 1 to 4 carbon atoms; and

X is a salt-forming anion exemplified by bromide, chloride, iodide, acetate, sulfate, sulfonate, and phosphate.

By this invention there are made available new types of (N)-quasi phosphonium salts which are easily prepared from readily available raw materials. The new bis(tert-alkylamino)phenylalkylphosphonium, bis(tert-alkylamino)phenylalkenylphosphonium, and bis(tert-alkylamino)phenylaralkylphosphonium salts of this invention have biocidal properties. They are particularly useful as fungicides and algaecides.

Heretofore the only (N)-quasi phosphonium halides derived from phenyl-bis(amino)phosphines, also known as benzbenephosphonous diamides, have been those made from Arene($R_2N$)$_2$P compounds wherein the aryl group was derived from benzene or toluene and the $R_2N$ portion of the structure was derived from the cyclic secondary amines piperidine and α,β-benzopiperidine. Benzenephosphonous dipiperidide and p-toluenephosphonous dipiperidide have been reacted with lower alkyl and benzyl halides, and benzenephosphonous bis(α,β-benzopiperidide) has been reacted with methyl iodide, to form the corresponding (N)-quasi phosphonium halides, also known as quaternary phosphonium halides. These compounds having nitrogen in a cyclic ring are inadequate as biocidal agents. Quaternary phosphonium halides have also been prepared from phosphorous triamides, ($R_2N$)$_3$P compounds, by the addition of alkyl or benzylhalides. These compounds are known to be herbicidal and exhibit little other biocidal activity.

The (N)-quasi phosphonium halides may be prepared stepwise as follows: (1) an aryldichlorophosphine is reacted with tertiary-alkylamines, i.e., primary amines in which the $NH_2$ group is attached to the alkyl group through a carbon atom to which there is no hydrogen attached but only alkyl groups, to give aryl-bis(tert-alkylamino)phosphines; (2) an aryl-bis(tert-alkylamino)phosphine is reacted with a quaternizing agent such as organic halides, including alkyl halides, alkenyl halides, or benzyl halides, methyl sulfate or methyl p-toluenesulfonate to give a quaternary phosphonium salt, and (3) a quaternary phosphonium halide may be reacted with a metal salt having the anion X which it is desired to supply to the phosphonium group, such as sodium acetate, sodium methyl sulfate, sodium p-toluenesulfonate and other organic sulfonates, and sodium phosphates.

The preparation of aromatic dichlorophosphines by the interaction of aromatic hydrocarbons with phosphorus trichloride in the presence of aluminum chloride was accomplished for the first time by Michaelis. By his Friedel-Crafts procedure phenyldichlorophosphine is made from benzene and the isomeric tolyldichlorophosphines from toluene as described in Organic Reactions, volume VI (published by John Wiley & Sons, Inc.), pp. 301–2. In like manner, other alkylbenzenes and chlorinated benzenes can be so reacted. Phenyl and 4-tolyldichlorophosphines are commercially available. These compounds are variously known as aryldichlorophosphines, dichloroarylphosphines, or arenephosphonous dichlorides.

The aryldichlorophosphines are reacted with tertiary-alkyl primary amines to give aryl-bis(tert-alkylamino)phosphines herein used as intermediate compounds and which are new compositions of matter. The general method of preparation of these new compounds is to react between about $-20°$ and $50°$ C. the aryldichlorophosphine with a tertiary-alkylamine by mixing in the presence of an acid acceptor, such as a tertiary amine, of which triethylamine, pyridine, or benzyldimethylamine are examples, or an excess of the tertiary-alkyl primary amine or an inorganic base such as sodium carbonate, best in an anhydrous, inert solvent such as diethyl ether, dioxane, ethyl acetate, or toluene, usually with cooling. The product may be isolated by removing the amine hydrochloride or salt which forms as a precipitate, concentrating the filtrate and, if desired, distilling the residue.

The preferred tertiary-alkylamines used are those represented by the formula

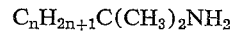

wherein n may be a number from 1 to 15, i.e. the tertiary alkyl group may contain from 4 to 18 carbon atoms. The most usual and commercially available tert-alkylamines are tert-butylamine, tert-octylamine, tert-nonylamine, which is usually prepared as a mixture where n in the above general formula has principally a value of 6 to 7 and has a neutral equivalent of about 142, and a mixture of amines (known commercially by the trademarked name Primene 81–R) wherein n in the above formula is principally 9 to 12 and which usually has a neutral equivalent of about 191. Tertiary-alkylamine mixtures wherein n has a value of 12 to 15 may also be used, but those amines wherein the value of n is less than 12 are preferred. Higher molecular weight tert-alkylamines such as those wherein the number of carbon atoms in the tertiary-alkyl group is 19 to 24 react very sluggishly, produce products which are difficult to define and which have reduced fungicidal properties, and are generally impractical.

Quaternary phosphonium salts are prepared by the general addition reaction of phosphines with reactive organic halides or other quaternizing agent with or without the presence of an inert solvent, most often at room temperature followed by a heating period to complete the reaction. Temperatures between 20° C. and 225° C. may be used depending upon the particular activity of the reactants. With aryl-bis(tert-alkylamino)phosphines, solvents most usually employed are ethers, dioxane, acetonitriles, ketones, dimethylformamide, nitromethane, and aliphatic and aromatic hydrocarbons. The reactive organic halides employed in this invention are (1) alkyl bromides, chlorides, or iodides wherein the alkyl group contains from 1 to 20 carbon atoms, such as dodecyl bromide and chloride, eicosyl bromide, and methyl and butyl iodides, (2) alkenyl halides wherein the alkenyl group contains from 3 to 16 carbon atoms, such as allyl bromide, chloride or iodide and 5,5,7,7,-tetramethyl-2- actenyl bromide, chloride, or iodide, (3) benzyl halides such as benzyl bromide, chloride, or iodide or 2,4-dichlorobenzyl bromide, chloride or iodide, or dodecylbenzyl bromide, chloride, or iodide. Other quaternizing agents include organic sulfates such as dimethyl sulfate, and organic sulfonates such as methyl p-toluenesulfonate. Such agents are preferably used in approximately stoichiometric proportion.

The following examples illustrate the invention. All parts are by weight unless otherwise indicated.

*Example I*

A. PREPARATION OF BENZENEPHOSPHONOUS DI(TERTIARY BUTYLAMIDE), $C_6H_5P(NHC_4H_9\text{-TERT})_2$ A solution of 438 parts (6 moles) of tert-butylamine in 500 parts of anhydrous diethyl ether is cooled in an ice bath to 5° C. This solution with stirring is added dropwise 179 parts (1 mole) of benzenephosphonous dichloride (also known as phenyldichlorophosphine) in about 30 minutes. Stirring and cooling of the mixture are continued for one hour. An insoluble precipitate of tert-butylamine hydrochloride is formed. The reaction mixture is filtered and the filtrate distilled. The product fraction is collected at 97° C. to 100° C. at 0.2 mm. (Hg) pressure. It is 156 parts of a yellow oil and represents a 62% yield of benzenephosphonous di(tert-butylamide). This contained by analysis 66.51% C, 10.01% H, 10.98% N, and 12.3% P. Calculated for $C_{14}H_{25}N_2P$ is 66.64% C, 9.91% H, 11.10% N, and 12.26% P.

B. PREPARATION OF BIS(TERT-BUTYLAMINO)PHENYLMETHYLPHOSPHONIUM IODIDE

To a flask outfitted with a stirrer, there is added 25.2 parts (0.1 mole) of benzenephosphonous di(tert-butylamide). To this with stirring is added dropwise 14.2 parts (0.1 mole) of methyl iodide. Heat is evolved and a solid product forms from the beginning of the addition. To the solid is added 25 parts of isopropyl ether and the lumps are broken up. There results a white crystalline product which is filtered off, washed with isopropyl ether, and air dried. The product amounts to 30 parts. It melts at 168° C. to 169° C. It contained by analysis 31.09% ionizable iodine, 7.03% N, and 7.76% P. Calculated for $C_{15}H_{28}IN_2P$ is 32.2% I, 7.11% N, and 7.88% P. The product is obtained in a 76% yield of bis(tert-butylamino)phenylmethylphosphonium iodide.

This type of compound may be termed an (N)-quasi quaternary phosphonium salt but is often referred to simply as a quaternary phosphonium salt. True quaternary phosphonium salts have four groups attached to a phosphorus atom through a carbon atom to form an organic phosphonium cation, e.g. $R_4P^+$ where R is a monovalent organic radical. The (N)-quasi phosphonium salts of this invention differ from the quaternary phosphonium salts, in that two of the groups are attached to the phosphorus atom through a nitrogen atom and are thus derivatives of organic phosphonous acids. The process of preparing the (N)-quasi phosphonium salts of this invention may be termed a quaternization of an organic phosphonous diamide.

*Example II*

PREPARATION OF BIS(TERT-BUTYLAMINO)PHENYLBUTYLPHOSPHONIUM IODIDE

To 25.2 parts (0.1 mole) of benzenephosphonous di(tert-butylamide) with stirring is added 18.4 parts (0.1 mole) of butyl iodide. A very little heat is evolved and the stirred mixture is heated up to 150° C. over a period of 15 minutes. A solid product is formed which is cooled and broken up in 25 parts of isopropyl ether. The solid is filtered, washed with isopropyl ether, and air dried to give 35 parts of white crystalline solid. It melts at 226° C. to 228° C. This is an 80% yield of bis(tert-butylamino)phenylbutylphosphonium iodide. It contains by analysis 29.15% ionizable iodine, 6.43% N, and 7.44% P. Calculated for $C_{18}H_{34}IN_2P$ is 29.1% I, 6.42% N, and 7.10 %P.

*Example III*

PREPARATION OF BIS(TERT-BUTYLAMINO)PHENYLDODECYLPHOSPHONIUM BROMIDE

A. To 25.2 parts (0.1 mole) of benzenephosphonous di(tert-butylamide) is added 24.9 parts (0.1 mole) of dodecyl bromide over a period of about 25 minutes. There is no exotherm, and the stirred mixture is then heated at 140° C. to 210° C. over a period of 10.5 hours. There results a dark brown, viscous syrup. The cooled syrup is washed twice by decantation with 50 parts isooctane to remove unreacted starting materials. The residual syrup is heated in a vacuum oven at 75° C. for about six hours. The syrup amounts to 24 parts. By analysis, it was found to contain 15.88% ionizable bromine, 5.82% N, and 6.36% P. Calculated for $C_{26}H_{50}BrN_2P$ is 15.93% Br, 5.58% N, and 6.17% P, thus corresponding to a 48% yield of bis(tert-butylamino)phenyldodecylphosphonium bromide.

B. There is substituted for the dodecylbromide used in (A) 20.3 parts of 5,5,7,7-tetramethyl-2-octenyl chloride (prepared by the method of U.S. Patent 2,689,873) and the same procedure is followed. There is obtained a viscous syrup which by analysis corresponds to bis(tert-butylamino)phenyl - (5,5,7,7-tetramethyl-2-octenyl)phosphonium chloride.

*Example IV*

PREPARATION OF BIS(TERT-BUTYLAMINO)PHENYL-2,4-DICHLOROBENZYLPHOSPHONIUM CHLORIDE

A stirred mixture of 25.2 parts (0.1 mole) of benzenephosphonous di(tert-butylamide) and 19.5 parts (0.1 mole) of 2,4-dichlorobenzyl chloride is heated over a period of about 20 minutes from room temperature to about 130° C. The reaction mixture solidifies and is cooled and the mass is broken up in 25 parts of isopropyl ether, filtered, washed with another 25 parts of isopropyl ether and air dried to give 40 parts of bis(tert-butylamino)phenyl - 2,4 - dichlorobenzylphosphonium chloride as a white, crystalline solid which melts at 215° C. to 220° C. It is obtained in a 90% yield. It contains by analysis 8.14% ionizable chlorine, 6.18% N, and 7.04% P. Calculated for $C_{21}H_{30}Cl_3N_2P$ is 7.95% chloride ion, 6.28% N, and 6.92% P.

*Example V*

PREPARATION OF BIS(TERT-BUTYLAMINO)PHENYL-2,5-DICHLOROBENZYLPHOSPHONIUM CHLORIDE

When a mixture of 12.87 parts of benzenephosphonous di(tert-butylamide) and 10 parts of 2,5-dichlorobenzyl chloride is heated slightly, a solid reaction product results. This is washed several times with isooctane and is then digested with hot acetone and dried in a vacuum oven. There is obtained 5 parts of a white crystalline solid which melts at 243.5° C. to 245° C. and contains 23.72% Cl, 6.30% N, and 6.96% P. Calculated for $C_{21}H_{30}Cl_3N_2P$ is 23.75% Cl, 6.25% N, and 6.90% P. It is bis(tert-butylamino)phenyl - 2,5 - dichlorobenzylphosphonium chloride.

*Example VI*

PREPARATION OF BIS(TERT-BUTYLAMINO)PHENYLDODECYLBENZYLPHOSPHONIUM IODIDE

A. To 12.6 parts (0.05 mole) of benzenephosphonous di(tert-butylamide) is added over a period of 25 minutes 19.3 parts (0.05 mole) of dodecylbenzyl iodide. The reaction mixture is then stirred and heated at about 100° C. for 40 minutes. The resulting viscous oil is cooled and washed with 25 parts of warm isopropyl ether. The washed oil is warmed in a vacuum desiccator for one hour to remove the residual isopropyl ether. There remains 27 parts of a viscous oil which after standing two days solidifies to a glass which melts at approximately 90° C. The yield is 85% of bis(tert-butylamino)phenyldodecylbenzylphosphonium iodide. It contains by analysis 20.88% ionizable iodine, 4.27% N, and 4.76% P. Calculated for $C_{33}H_{56}IN_2P$ is 19.9% I, 4.38% N, and 4.85% P.

B. There is substituted 14.8 g. (0.05 mole) of dodecylbenzyl chloride for the dodecylbenzyl iodide in the above procedure and there is obtained 24.5 parts of a dark viscous oil. It contains by analysis 5.74% Cl, 4.48% N, and 5.01% P. Calculated for $C_{33}H_{56}ClN_2P$ is 6.5% Cl, 5.12% N, and 5.67% P. The product is obtained in an 88% yield of a technical grade of bis(tert-butylamino)phenyldodecylbenzylphosphonium chloride.

*Example VII*

PREPARATION OF BIS(TERT-BUTYLAMINO)PHENYLDODECYLBENZYLPHOSPHONIUM p - TOLUENESULFONATE

To a solution of 10.6 parts (0.0237 mole) of bis(tert-butylamino)phenyldodecylbenzylphosphonium chloride in 50 parts of water is added 4.6 parts (0.024 mole) of sodium p-toluenesulfonate. The solution is heated to 60° C. and two layers form. The lower oil layer is separated from the hot mixture and is dried overnight in a vacuum oven at 60° C. There is thus obtained 9 parts of a product which corresponds in composition to bis(tert-butylamino)phenyldodecylbenzylphosphonium p-toluenesulfonate.

*Example VIII*

A. PREPARATION OF BENZENEPHOSPHONOUS DI-(TERT-OCTYLAMIDE), $C_6H_5P[NHC(CH_3)_2CH_2C(CH_3)_3]_2$

To a stirred solution of 129.2 parts (1 mole) of tert-octylamine (1,1,3,3 - tetramethylbutylamine) and 101.2 parts (1 mole) of triethylamine in 350 parts of anhydrous diethyl ether is added dropwise 89.5 parts (0.5 mole) of benzenephosphonous dichloride. Insoluble triethylamine hydrochloride immediately precipitates. After stirring for about one hour, the reaction mixture is filtered and the residue is washed with anhydrous ether. The filtrate and washings are combined and the ether is removed by heating on a steam bath, leaving benzenephosphonous di(tert-octylamide) as a yellow oil residue.

B. PREPARATION OF BIS(TERT-OCTYLAMINO)PHENYLDODECYLPHOSPHONIUM BROMIDE

A mixture of 16 parts (0.043 mole) of benzenephosphonous di(tert-octylamide) and 10.9 parts of dodecyl bromide is heated on a steam bath for 6 hours, then for about 8 hours at 130° to 150° C. After standing several days, a viscous mass results and is treated with warm isooctane. Cooling gives a solid which is filtered off and dried in a vacuum oven at 75° C. to give 20 parts of solid product. It contains by analysis 4.64% N and 5.24% P. Calculated for $C_{34}H_{66}BrN_2P$ is 4.56% N and 5.04% P. An infrared spectrograph and the analyses correspond to the bis(tert-octylamino)phenyldodecylphosphonium bromide structure.

*Example IX*

A. PREPARATION OF $C_6H_5-P[NHC_{12-15}H_{25-31}-TERT]_2$

To a stirred mixture of 254 parts (1.42 moles of benzenephosphonous dichloride and 567 parts (2.84 moles) of a mixture of tertiary-alkyl primary amines wherein the carbon content of the tert-alkyl group ranges from $C_{12}$ to $C_{15}$ (the commercial form known as Primene 81–R may be used) in 500 parts of anhydrous diethyl ether is added 312 parts of triethylamine (3.08 moles) dropwise over a period of an hour. The mixture is stirred one hour, then allowed to stand overnight. The precipitated triethylamine hydrochloride is filtered off and washed with anhydrous ether. The filtrate and washings are combined and the ether removed. There remains 558 parts of a semi-viscous, clear, yellow liquid. This corresponds to a 74.5% yield of the benzenephosphonous diamide, $C_6H_5P[NHC_{13}H_{27}-tert]_2$, having an average molecular weight of 504. It contains by analysis 73.49% C, 11.84% H, 5.43% N, and 6.10% P, and is found to contain 1.3% ionizable chlorine indicating a slight amount of triethylamine hydrochloride impurity. Calculated for $C_{32}H_{61}N_2P$ is 76.1% C, 12.2% H, 5.55% N, and 6.14% P.

B. PREPARATION OF $C_6H_5[TERT-C_{13}H_{27}NH]_2(CH_3)P^+\cdot I^-$ (1) To 23.8 parts of the benzenephosphonous diamide prepared in Part A of this example is added 8 parts of methyl iodide in a 5-minute period. An exotherm raises the temperature to 80° C. and the mixture becomes very viscous. It is then heated at 80° C. for one hour. After cooling to room temperature, the reaction product is washed by a decantation procedure with petroleum ether. The washed product is heated in a vacuum oven at 54° C. overnight to give 28 parts of an opaque, viscous liquid. It contains 21.05% ionizable iodine, 4.13% N, and 4.94% P. Calculated for $C_{33}H_{64}IN_2P$ is 19.62% I, 4.34% N, and 4.80% P. The product has an average molecular weight of 647.

(2) By substituting 10 parts of butyl iodide for methyl iodide in the above preparation there is obtained 18 parts of a viscous syrup. It contains 17.97% ionizable iodine, 3.68% N, and 4.06% P. Calculated for $C_{36}H_{70}IN_2P$ is 18.45% I, 4.07% N, and 4.51% P. It is bis(tert-tridecylamino)phenylbutylphosphonium iodide.

(3) By substituting 19.3 parts of dodecylbenzyl iodide for methyl iodide in the above preparation there is obtained 36 parts of a dark, viscous oil. It contains 14.30% ionizable iodine, 2.93% N, and 3.48% P. Calculated for $C_{51}H_{92}IN_2P$ is 14.25% I, 3.14% N, and 3.48% P. It is bis(tert-tridecylamino)phenyldodecylbenzylphosphonium iodide.

(4) By substituting 14.6 parts of dodecylmethylbenzyl chloride for methyl iodide in the above preparation there is obtained a dark, viscous oil which by analysis corresponding to the structure

$C_6H_5(tert-C_{13}H_{27}NH)_2C_{12}H_{25}(CH_3)C_6H_3CH_2P^+\cdot Cl^-$

*Example X*

PREPARATION OF BIS(TERT-OCTYLAMINO)TOLYLMETHYLPHOSPHONIUM IODIDE (1) Toluene is reacted with phosphorus trichloride in accordance with the literature method described in the journal of the American Chemical Society 73, 755 (1951). Tolyldichlorophosphine is obtained in about a 70% weight yield as a liquid distilling at 105° C at 9 mm. (Hg) pressure and having a refractive index at 25° C. of 1.5839. The corresponding literature values are a boiling range of 107° C. to 110° C. at 10 mm. pressure and an $n_D^{25}$ of 1.5865.

(2) Tolyldichlorophosphine is reacted with tert-octylamine by the general method described under Example VIII, Part A. Tolylphosphonous di(tert-octylamide) is obtained as a yellow oil.

(3) Tolylphosphonous di(tert-octylamide) is quaternized with methyl iodide by the general procedure described in Example I, Part B. A solid product is obtained which by infrared and nitrogen and phosphorus analyses corresponds to bis(tert-1,1,3,3-tetramethylbutylamino)tolylmethylphosphonium iodide.

*Example XI*

PREPARATION OF n-BUTYLPHENYLDICHLOROPHOSPHINE (1) Into a flask which has been flamed and flushed with dry nitrogen is placed 269 parts (196 moles) of a reagent grade of phosphorus trichloride. With stirring, there is added 66 parts (0.49 mole) of freshly dried and distilled n-butylbenzene, followed by the portionwise addition over a period of five minutes of 88 parts (0.66 mole) of a reagent grade of sublimed aluminum chloride. The $AlCl_3$ dissolves with a slight exotherm and the mixture changes color to a shade of green. The reaction mixture is gradually warmed to a reflux temperature of 78° C. and maintained at reflux for about four hours. Hydrogen chloride is evolved, is trapped and is periodically titrated.

After the four hours heating period, it is shown that 90% of the theoretical hydrogen chloride has been evolved. Unreacted $PCl_3$ is stripped off on a steam bath under slightly reduced pressure. While the concentrated reaction mixture is still hot, there is added 101 parts (0.66 mole) of phosphorus oxychloride. This complexes with the aluminum chloride to give a white, granular precipitate. The mixture is extracted with 400 parts of dry hexane and the extract is concentrated to remove the solvent leaving a yellow oil residue. The oil residue is distilled to give 128 parts of a product distilling at 95° C. at 0.3 mm. (Hg) pressure and which has a refractive index at 25° C. of 1.5585. The product contains by analysis 30.05% Cl, 51.09% C, 5.87% H, and 12.89% P. Calculated for $C_{10}H_{12}Cl_2P$ is 30.2% Cl, 51.1% C, 5.57% C, 5.57% H, and 13.18% P. By infrared spectroscopy, it was shown to be a mixture of ortho and para-n-butylphenyldichloro phosphine.

(2) The above n-butylphenyldichloro phosphine is reacted with tert-butylamine by the general procedure described for Example I, Part A. n-Butylbenzenephosphonous di(tert-butylamide) is obtained as a yellow oil.

(3) n-Butylbenzenephosphonous di(tert-butylamide) is reacted with an equimolar quantity of allyl chloride by the general method of Example III, Part B. There is obtained an oil which by analysis corresponds to bis(tert-butylamino)-n-butylphenylallylphosphonium chloride.

*Example XII*

PREPARATION OF CHLOROPHENYLDICHLOROPHOSPHINE (1) By the general procedure described in Example XI(1) for the preparation of n-butylphenyldichloro phosphine, chlorobenzene is reacted with phosphorus trichloride in the presence of aluminium chloride. After heating the reaction mixture at reflux temperature (77° C.) for about seven hours, it is shown that 75% of the theoretical hydrogen chloride is evolved. The isolated product is a colorless liquid distilling in the range of 58° C. to 80° C. at 0.25 mm. to 0.5 mm. (Hg) pressure and has a refractive index at 27.5° C. of 1.6069. By infrared spectroscopy, this product is shown to be a mixture of ortho and para-chlorophenyldichlorophosphine.

In the same manner as described above for chlorobenzene, o-dichlorobenzene and m-dichlorobenzene may be reacted with $PCl_3$. In these instances, the reactions are much slower. For m-dichlorobenzene a refluxing time of 50 hours is required to evolve 80% of the theoretical hydrogen chloride, and for o-dichlorobenzene a refluxing period of about 65 hours gives 70% of the theoretical quantity of hydrogen chloride as an evolved gas. 3,4-dichlorophenyldichlorophosphine is isolated as a colorless oil distilling at 88° C. to 89° C. at 0.25 to 0.35 mm. (Hg) pressure. 2,4-dichlorophenyldichlorophosphine is isolated as a somewhat yellow oil distilling with decomposition at 98° C. to 100° C. at 0.25 to 0.35 mm. (Hg) pressure. In common with most aryldichlorophosphines these products fume in moist air and have an obnoxious odor.

(2) Chlorophenyldichlorophosphine is reacted with tert-butylamine by the general procedure described for Example I, Part A. Chlorobenzenephosphorous di(tert-butylamide) is obtained as a yellow oil.

(3) Chlorobenzenephosphonous di(tert-butylamide) is reacted with 2,4-dichlorobenzyl chloride by the procedure described under Example IV. By analysis, the product is shown to be bis(tert-butylamino)chlorophenyl-2,4,-dichlorobenzylphosphonium chloride.

When (N)-quasi phosphonium salts are used as agricultural and horticultural pesticides on living plants, it is preferred that they be relatively non-phytotoxic. In such cases, it is desirable to use an anion X which combined with a particular phosphonium group is inocuous. This may be accomplished through the choice of the quaternizing agent $R^1X$ or of the salts such as NaX which is reacted with a (N)-quasi phosphonium halide to produce (N)-quasi phosphonium salt of anion X. In the case where X is a halide those halides having an atomic weight of 35 to 127 are used.

For use as pesticides, the compounds of this invention are usually taken up in a carrier or are formulated so as to render them suitable for subsequent dissemination as pesticides. For example, the (N)-quasi phosphonium salts may be formulated as wettable powders, emulsion concentrates, dusts, granular formulations, aerosols, or flowable emulsion concentrates. In such formulations the phosphonium salts are extended with a liquid or solid carrier and, when desired, suitable surfactants are incorporated. In case the (N)-quasi phosphonium salt is water-soluble, it may be dissolved directly in water to provide an aqueous spray. Similarly, such compounds may be dissolved in a water-miscible liquid such as ethanol, isopropanol or acetone, and such solutions extended with water. For the preparation of emulsion concentrates for agricultural and horticultural use, compounds which are soluble in organic solvents are taken up in such organic solvents as xylene, pine oil, orthodichlorobenzene, or methyl oleate, or a mixture of solvents together with an emulsifying agent which permits dispersion of the pesticide in water. Sprays may also be prepared by taking up the compound with a finely divided solid, such as clays, inorganic silicates and carbonates, and silicas, and incorporating wetting agents, sticking agents, and/or dispersing agents in such mixtures. For dusts the compound is taken up with a finely divided solid which may be organic or inorganic in nature.

The compounds were evaluated in the standard slide spore germination (cf. J. Phytopathology 33, 354) utilizing spores of *Alternaria solani* (A.s.), *Monilinia fructicola* (M.f.) and *Stemphylium sarcinaeforme* (S.s.). The $ED_{50}$ values which were obtained in parts per million (p.p.m.) are summarized in Table I:

TABLE I.—$ED_{50}$ VALUES FOR TYPICAL COMPOUNDS

| The Compound Of | $ED_{50}$ (p.p.m.) | | |
|---|---|---|---|
| | A.s. | M.f. | S.s. |
| Example I, Part B | <200 | <1,000 | <1,000 |
| Example II | <200 | <1,000 | <200 |
| Example III, Part A | <10 | <10 | <1 |
| Example IV | <200 | <200 | <50 |
| Example V | <200 | <200 | <50 |
| Example VI, Part A | <10 | <1 | <1 |
| Example VI, Part B | <10 | <1 | <10 |
| Example VIII, Part B | <50 | <10 | <10 |
| Example IX, Part B(1) | <10 | <10 | <10 |
| Example IX, Part B(2) | <50 | <10 | <10 |
| Example IX, Part B(3) | <200 | <1,000 | <200 |

The values show that this class of compounds has considerable fungicidal activity. Those compounds with $ED_{50}$ values of less than 10 p.p.m. are outstandingly effective against phytopathogens.

The compounds were also evaluated for their activity on late blight, *Phytophthora infestans*, of tomatoes and were found to give control at least equal to and in many instances superior to the zineb standard without lasting injury to young tomato plants.

In standard greenhouse herbicide tests, these compounds were found to be very low in phytotoxic activity to representative monocotyledonous and dicotyledonous plants.

The quaternary phosphonium salts of this invention exhibit marked algaecidal properties. In standardized tests involving *Chlorella pyrenoidosa* (or green algae), Phormidium spp. (known as "Square D" algae), and Oscillatoria spp. (known as black algae) bis-(tert-butylamino)phenyldodecylphosphonium bromide, bis(tert-butylamino)phenyldodecylbenzylphosphonium chloride and iodide, bis-(tert-butylamino)phenyl-2,4-- dichlorobenzylphosphonium chloride, bis-(tert-tridecylamino)-phenylbutylphoshonium iodide, and bis-(tert-tridecylamino)phenyldodecylbenzylphosphonium iodide gave complete control of at least one specie of algae at concentrations less than 1 p.p.m. These compounds are thus shown to be of unusual activity in this regard.

The (N)-quasi phosphonium salts are conveniently made in the form of the halides. Alkyl, alkenyl, and benzyl bromides, chlorides, and iodides are for the most part either commercially available or easily prepared. In general, they react readily with the new arenephosphonous diamides revealed in this invention. As indicated above, the halide atoms of the (N)-quasi phosphonium halides can be readily replaced by conventional methods by other anions. Organic sulfonates have particular value and in the same way as shown for sodium p-toluenesulfonate in Example VII there can be used sodium lignosulfonate, sodium naphthalenesulfonate, the sodium salt of condensed formaldehyde-naphthalenesulfonate, and the like. Such sulfonates often have the effect of preventing the development of phytotoxicity. Organic carboxylates are sometimes desirable as anions for the same reason, and the (N)-quasi phosphonium halides may be reacted with sodium carboxylates such as sodium acetate or sodium propionate to form these.

This invention thus provides a new class of quaternary phosphonium salts of a type which may also be referred to as (N)-quasi phosphonium salts, which are derived from new members of organic phosphorus diamides. The new phosphonium salts are readily made by a convenient process from available raw materials and are economical products. The phosphonium salts of this invention provide new biocidal agents for various types of pest control, and are outstandingly useful for the control of algae and fungi attacking plants.

We claim:

1. The compound of the formula

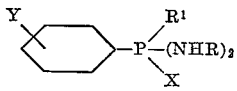

wherein R is a tertiary-alkyl group of 4 to 18 carbon atoms, R¹ is a member of the group consisting of alkyl groups of 1 to 20 carbon atoms, alkenyl groups of 3 to 16 carbon atoms, and benzyl groups of the formula

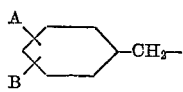

wherein A and B are selected from the class consisting of hydrogen, chlorine, and alkyl groups of 1 to 12 carbon atoms, the sum of the carbon atoms being 1 to 13 when A and B are taken together, Y is selected from the group consisting of hydrogen, chlorine, and alkyl groups of 1 to 4 carbon atoms, and X is a salt-forming anion selected from the group consisting of acetate, halides, phosphate, sulfate and sulfonate.

2. The compound of the formula, $$\text{Phenyl}(C_{12}H_{25})(\text{tert-}C_4H_9NH)_2P^+\cdot Br^-$$

3. The compound of the formula,

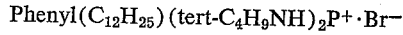
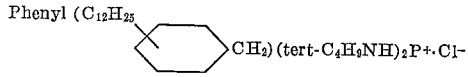

4. The compound of the formula,

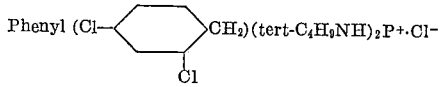

5. The compound of the formula, $$\text{Phenyl}(C_{12}H_{25})(\text{tert-}C_8H_{17}NH)_2P^+\cdot Br^-$$

6. The compound of the formula, $$\text{Phenyl}(CH_3)(RNH)_2P^+\cdot I^-$$

wherein R is a tertiary-alkyl group of 12 to 15 carbon atoms.

References Cited by the Examiner
UNITED STATES PATENTS

| | | | |
|---|---|---|---|
| 2,703,814 | 3/1955 | Dye | 260—551 |
| 2,774,658 | 12/1956 | Dye | 260—551 |
| 2,934,564 | 4/1960 | Burg et al. | 260—551 |

OTHER REFERENCES

Ewart et al.: J. Chem. Soc., 1962, pp. 3884–3990 (October 1962).

Gutmann et al.: Monatshefte für Chemie, vol. 91, pp. 836–839 (1960).

Kosolapoff: Organo Phosphorus Compounds, pp. 277–278 and 325–326 (1950).

Michaelis: Chemische Berichte, vol. 31, pp. 1037–1044 (1898).

Sisler et al.: J. Org. Chem., vol. 26, pp. 4733–4734 (November 1961).

Smith: J. Org. Chem., vol. 28, pp. 863–865, (March 1963).

WALTER A. MODANCE, *Primary Examiner.*

IRVING MARCUS, JOHN D. RANDOLPH,
*Examiners.*